US005461673A

United States Patent [19]

Coons

[11] Patent Number: 5,461,673

[45] Date of Patent: Oct. 24, 1995

[54] HOSPITAL BED SIDEGUARD MOUNTABLE TELEPHONE

[75] Inventor: John C. Coons, Cincinnati, Ohio

[73] Assignee: Hill-Rom Company, Inc., Batesville, Ind.

[21] Appl. No.: 16,610

[22] Filed: Feb. 11, 1993

[51] Int. Cl.$^6$ ..................... H04M 1/00

[52] U.S. Cl. ..................... 379/446; 379/426; 379/454; 379/455

[58] Field of Search ..................... 379/455, 454, 379/446, 426, 447, 449; 248/231.3, 316.2, 214, 231.4

[56] References Cited

U.S. PATENT DOCUMENTS

| | | | |
|---|---|---|---|
| 3,784,140 | 1/1974 | Auerbach | 248/214 |
| 4,431,154 | 2/1984 | Hamm . | |
| 4,602,755 | 7/1986 | Rosten . | |
| 5,129,117 | 7/1992 | Celestina et al. . | |
| 5,222,132 | 6/1993 | Rioux, Jr. | 379/455 |

OTHER PUBLICATIONS

American Cointel Corporation Brochure (2 pages), Feb. 15, 1994.

MED-PAT Brochure (6 pages), Jun. 1, 1989.

Webcor Electronics Inc. Brochure (2 pages), Feb. 15, 1994.

*Primary Examiner*—Jeffery A. Hofsass
*Assistant Examiner*—Jack Chiang
*Attorney, Agent, or Firm*—Barnes & Thornburg

[57] ABSTRACT

A telephone assembly that may easily and releasably be secured either directly to a hospital bed siderail or to a bracket which is in turn releasably secured to a hospital bed siderail. The base of the telephone is adapted to mate with a standard hospital bed siderail. A clamp is provided for releasably locking the base to the siderail of a hospital bed. Alternatively, the telephone base may be affixed to an offset mount which is in turn located between adjacent siderails of a hospital bed. The offset mount includes a clamp for releasably securing the offset mount to the siderails.

4 Claims, 6 Drawing Sheets

HOSPITAL BED SIDEGUARD MOUNTABLE TELEPHONE

FIELD OF THE INVENTION

The present invention relates generally to telephones and more particularly to telephones that are adapted to be secured to a hospital bed so that a patient can have ready access to a telephone while confined to bed.

BACKGROUND OF THE INVENTION

Ready access to a telephone by persons confined to hospital beds is very important. When a person is a patient in a health care facility or bedridden at home, access to a telephone (perhaps his or her only means of communicating with others) becomes critical. Merely placing a telephone near the bed may be insufficient or at least inconvenient. To overcome these problems and make use of a telephone by a person in a bed more convenient, various attempts at mounting a telephone directly to a hospital bed have been attempted.

Most of the prior attempts have focused on using brackets which are connected to the hospital bed sideguard. A standard telephone or patient communicator is then placed within a receptacle on the bracket as shown in Hamm U.S. Pat. No. 4,431,154, or a wall-type phone is suspended from the bracket as shown in Rosten U.S. Pat. No. 4,602,755. Although other methods have been attempted, all require that the telephone be mounted to a device which is in turn mounted to the hospital bed sideguard. Thus, when the phone is removed from the sideguard, the mounting device must either remain on the bed or be stored. In addition, the brackets or other mounting devices are either difficult to attach or do not provide a sufficiently secure attachment. Finally, with the prior attempts it is often necessary to remove the mounting bracket or device prior to the lowering of the siderail.

Therefore, there has been a significant need for a telephone assembly that can be directly, easily and securely attached to a hospital bed sideguard. Further, there is a need for a means of attaching a telephone assembly to a hospital bed sideguard in such a manner that the sideguard may be lowered without the necessity of removing the telephone assembly therefrom.

BRIEF DESCRIPTION OF THE INVENTION

In accordance with the present invention, a telephone assembly is provided which may be placed atop a flat surface as with conventional telephones; may be attached directly to a standard hospital bed siderail; or may be attached to an offset mount which in turn is attached to a hospital bed siderail. The base of the telephone assembly mates with a standard hospital bed siderail and includes a mechanism for locking the base to the siderail. An offset mount is used to attach the telephone assembly to the sideguard of a birthing bed, thus permitting the sideguard to be lowered without requiring the telephone assembly to be removed.

The telephone assembly comprises a base and a standard telephone handset. This base may be placed upon any suitable flat surface such as a tabletop or the like and, thus, the assembly may be used in the same manner as any ordinary desktop telephone. However, the telephone assembly may also be attached directly to a hospital bed siderail.

To accommodate a hospital bed siderail, and to permit the telephone assembly to be securely affixed thereto, the base includes a substantially rectangular or C-shaped channel extending the entire length of the base along the longitudinal dimension of the phone. This channel is sized to readily accommodate a standard hospital bed siderail, which typically is elliptical in cross section. Once the telephone assembly is placed atop the hospital bed siderail, a locking mechanism located in the channel secures the assembly to the siderail. Although any number of locking devices could be used along the channel, a single locking mechanism centered in the channel is preferred.

Any device that is capable of securing the telephone assembly to the siderail may be used, including friction fit, screws, or a clamp. However, a presently preferred locking mechanism utilizes a clamping assembly that is retained in the base. This clamping assembly is comprised of a thumb slide, an L-shaped clamping member, and a biasing spring. The thumb slide is retained in the base and slides in a track in a direction parallel to the longitudinal axis of the base. A wedge is located on the back side of the thumb slide. The L-shaped clamping member is laterally adjacent to the thumb slide. The long leg of this clamping member is slidably retained in the base to allow the member to move transversely, while the short leg extends downwardly, the back side of which forming one of the sides of the channel. A wedge for cooperation with that on the thumb slide is located on the front side of the short leg. As the thumb slide is moved in one direction, the corresponding wedges come into contact thereby moving the L-shaped clamping member in the transverse direction. This transverse motion narrows the channel thus enveloping the siderail and affixing the telephone assembly thereto. To detach the telephone assembly from the siderail, the thumb slide is moved in the other direction. A spring between the base and the L-shaped member biases the L-shaped member toward its unclamped position, thus restoring the clamping assembly to its unclamped configuration.

Although the telephone assembly solves the problems associated with a standard hospital bed, a unique problem is encountered with birthing beds. The siderail of a birthing bed can be vertically lowered and raised to permit a patient to be placed on, or removed from, the bed. Because the mattress of a birthing bed essentially abuts the siderail, and the telephone assembly envelops the siderail, the siderail could not be lowered without removing the telephone therefrom. To eliminate this problem, an offset mount bracket is used.

This bracket has three primary components: a main body, an offset arm, and a receptacle. The main body has opposing concave surfaces that are spaced to just fit between adjacent rails of the birthing bed sideguard. These concave surfaces have radii of curvature that are substantially the same as the radii of curvature of the siderails, thus establishing a large contact surface between the main body and the sideguard. In one embodiment, a threaded member is used to secure the main body of the bracket between the adjacent rails. The head of the threaded member passes through one of the main body's concave surfaces. As this threaded member is tightened, the opposing concave surface is forced into tight engagement with the sideguard.

In a presently preferred embodiment, a clamping assembly similar to that used to secure the telephone to a sideguard is used to secure the bracket to adjacent siderails. This clamping assembly is comprised of a thumb slide and a T-shaped clamping member. The thumb slide is retained in the bracket main body in a track in a direction parallel to the longitudinal axis of the main body. A wedge having a groove therein is located on the back side of the thumb slide. The T-shaped clamping member is vertically adjacent to the thumb slide wedge. The main body of this clamping member passes through the offset arm (which will be described below) and one of the main body concave surfaces, and is slidably retained in the vertical direction within these components. The head of this clamping member has a concave shape having a radius of curvature substantially the same as that of a standard siderail. This head extends along much of the length of the main body. The lower end of the clamping member is adapted to rest within the groove in the thumb slide wedge. As the thumb slide is moved in one direction, the wedge slides relative to the clamping member thereby moving the clamping member in the vertical direction. As the clamping member advances, the opposing concave surface of the main body is forced into tight engagement with the sideguard.

Since the main body portion of the bracket does not extend beyond the width of the sideguard, the sideguard is free to be lowered and raised without removing the bracket. The offset arm extends from the main body. A receptacle upon which the afore-mentioned telephone assembly can be secured is located at the end of this offset arm. The receptacle's cross-section is desirably substantially the same as the cross-section of a standard hospital bed siderail to facilitate the secure attachment of the telephone assembly thereto. With the offset mount bracket and telephone assembly, a telephone can be securely attached to a birthing bed sideguard without interfering with the sideguard's operation.

BRIEF DESCRIPTION OF THE DRAWINGS

The invention can best be described by reference to the drawings, in which.

DETAILED DESCRIPTION OF PREFERRED EMBODIMENT

Figure 1:
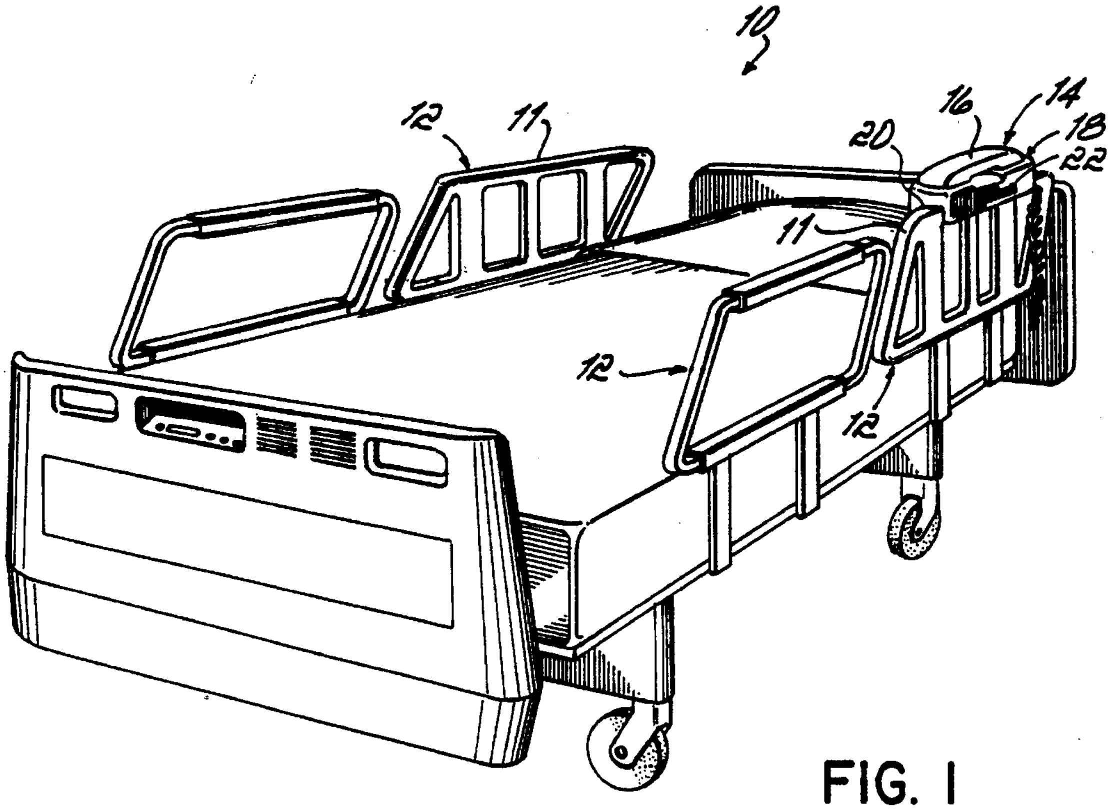
FIG. 1 is a perspective view of a hospital bed and of the telephone assembly attached to a hospital bed sideguard.
Figure 2:
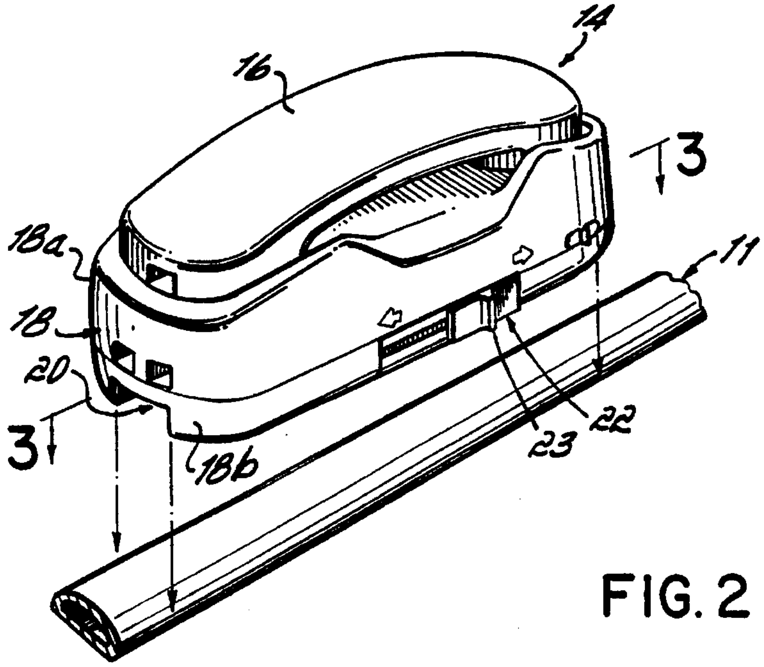
FIG. 2 is a perspective view of the telephone assembly detached from a rail of the sideguard.

Referring first to FIG. 1 of the drawings, the presently preferred embodiment of the telephone assembly 14 is shown attached to the siderail 11 of the sideguard 12 of a standard hospital bed 10. As shown in FIG. 2, the major external features of the telephone assembly 14 are a handset 16, a base 18 having upper and lower halves **18*a* and 18*b*, respectively, the lower half 18*b* having a channel 20 for attachment of the base 18 to the siderail 11, and a thumb slide 22 for releasably clamping the telephone assembly 14 to the siderail 11. The thumb slide 22 is shown in the unclamped position. When the thumb slide 22 is in this position, the telephone assembly 14 may freely be placed onto or removed from the hospital bed siderail 11. After the assembly 14 is placed onto the siderail 11 by aligning the channel 20 with the siderail 11, the assembly 14 is secured thereto by moving the thumb slide 22** to the clamped position, the specifics of which will be subsequently described.

Figure 3:
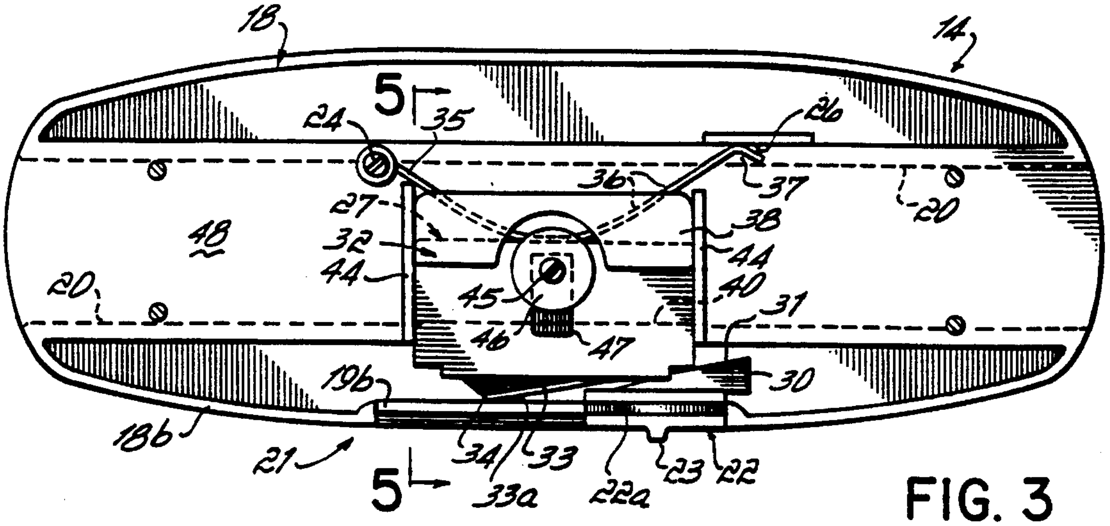
FIG. 3 is a top plan view of the telephone assembly with handset and upper part of base removed as shown on line 3—3 of FIG. 2 and with the clamping mechanism in the unclamped position.
Figure 4:
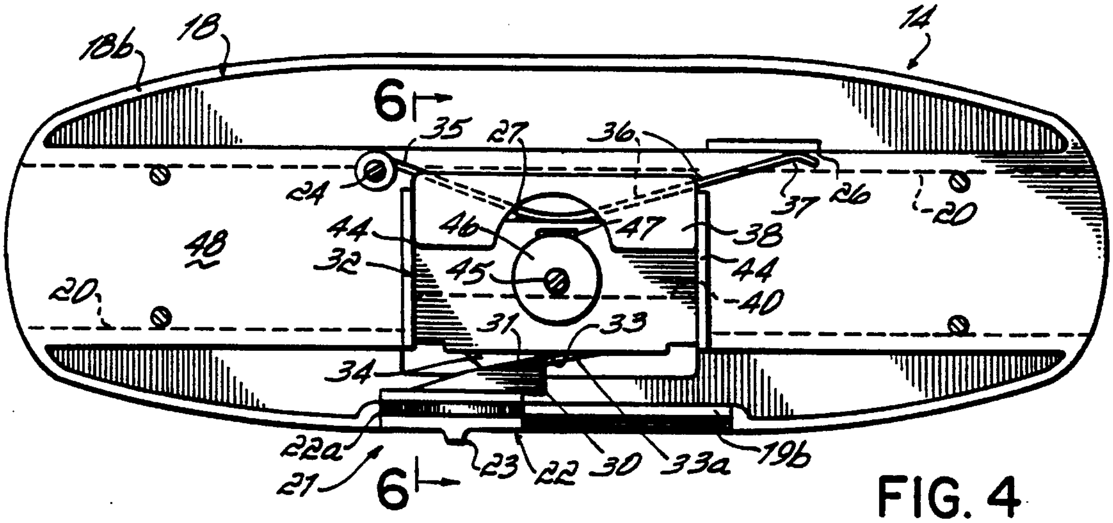
FIG. 4 is a view similar to FIG. 3, except with the clamping mechanism in the clamped position.
Figure 6:
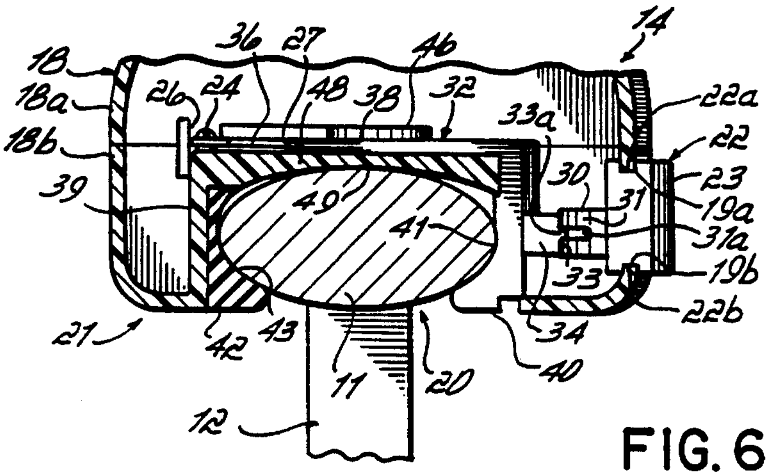
FIG. 6 is a sectional view taken on line 6—6 of FIG. 4.

Referring to FIGS. 3–8, the mechanism 21 for clamping the base 18 to the siderail 11 is shown. The thumb slide 22 is slidably retained in the lower half **18*b* of base 18 so that the thumb slide 22 can be moved in a direction parallel to the longitudinal dimension of the base. The thumb slide 22 has upper and lower longitudinal notches 22*a* and 22*b* which ride along upper and lower sections 19*a* and 19*b* of lower half 18*b* of base 18. Thumb slide 22 has a projection 23 for ease of movement of the slide as by a thumb. A clamping member 32 is also slidably retained in the lower half 18*b* of base 18. This clamping member 32 moves in a direction perpendicular to the longitudinal dimension of the base 18. Mating wedges 30 and 34 having respective wedge surfaces 31 and 33 are located on adjacent sides of the thumb slide 22 and clamping member 32, respectively. Thumb slide wedge surface 31 includes a notch 31*a* running the length of the wedge 30, while clamping member wedge surface 33 includes a projecting rib 33*a* running the length of the wedge 34 and for sliding movement within notch 31*a*. When mechanism 21 is in the unclamped position, these wedge surfaces 31 and 33 are not in contact. As the thumb slide 22 is moved from the position of FIG. 3 to the position of FIG. 4, the wedge surfaces 31, 33 engage and the clamping member 32 is urged laterally away from the thumb slide 22. The resulting configuration of the mechanism 21 in the clamped position is shown in FIGS. 4 and 6**.

To restore the clamping mechanism 21 to its original unclamped position (FIGS. 3,5,7 and 8), a biasing spring 36 is used. The biasing spring 36 is retained within the lower half **18*b* of base 18 by a screw 24 at the first end 35 of the spring 36, while the second end 37 of the spring 36 simply rests upon a vertical surface 26 within lower base half 18*b* and is free to translate parallel to the longitudinal dimension of the base 18 upon being deflected. Although any type of spring could be used, a bent metal wire of spring steel as shown is preferred. This has the advantage of being inexpensive, efficient, and easily connected to the base. The biasing spring 36 biases the clamping member 32 toward an unclamped position thereby restoring the clamping member to an unclamped position when the thumb slide 22** is moved from the clamped to the unclamped position.

Although any device that could serve to move the clamping member into and out of a clamped position may be used (such as a lever or screws), the thumb slide 22 has several advantages. First, there are a minimum of moving parts, thus reducing the likelihood that the clamping mechanism will fail. Second, a minimum of space is used. Finally, this method is inexpensive and easy to manufacture and maintain.

Figure 5:
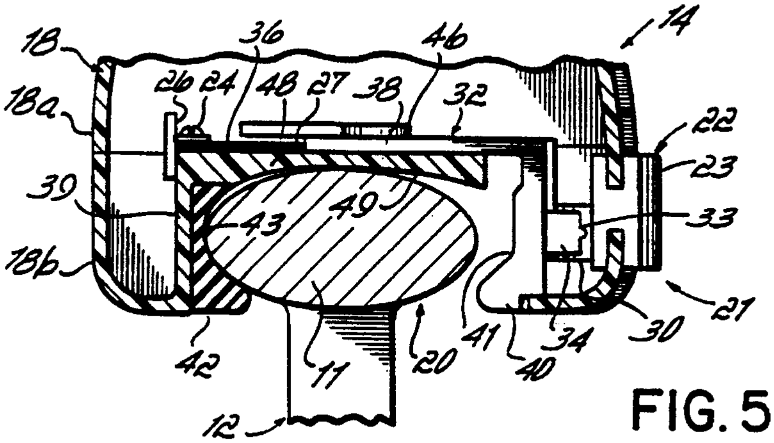
FIG. 5 is a sectional view taken on line 5—5 of FIG. 3.

To secure the telephone assembly 14 to the sideguard 12, the clamping member 32 consists of two members: a sliding leg 38 and a clamping leg 40 (FIGS. 5 and 6). The sliding leg 38 is the portion of the clamping member 32 that is slidably retained in the lower half 18*b* of base 18 and which is in communication with the biasing spring 36, while the clamping leg 40 is the portion which engages a side of the siderail 11.

More particularly, and as shown in FIGS. 3 and 4, the sliding leg 38 is positioned between two ribs 44, 44 which locate and permit the clamping member 32 to move in a direction perpendicular to the longitudinal dimension of the base 18. To retain the clamping member 32 between the ribs 44, 44, a screw 45 passes through a washer 46 atop the leg 38 and through a slot 47 in the leg 38 and is secured to a transversely extending portion 48 of the base 18. This screw 45 is tightened sufficiently to prevent the clamping member 32 from moving vertically, but not so tight as to prevent the clamping member from sliding between the ribs 44, 44. The biasing spring 36 contacts the sliding leg 38 along surface 27. It is through this contact that the clamping member 32 is biased toward an unclamped position.

Figure 7:
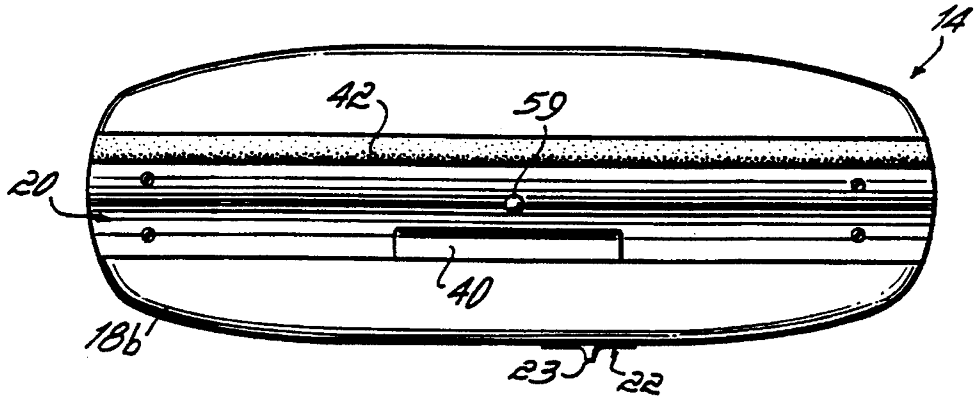
FIG. 7 is a bottom plan view of the telephone assembly with the clamping mechanism in the unclamped position.
Figure 8:
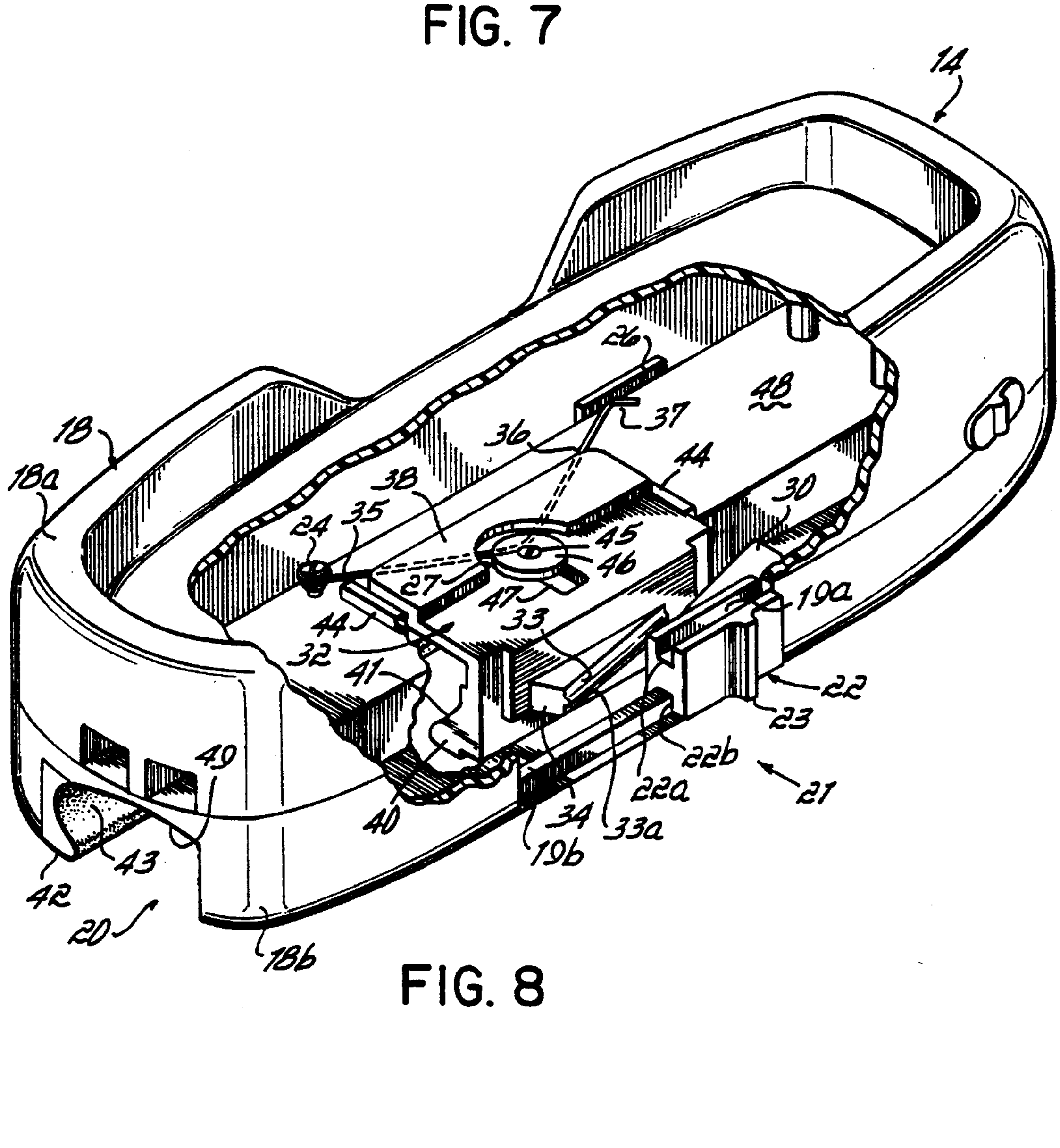
FIG. 8 is a perspective view, partially broken away, of the telephone assembly with the clamping mechanism in the unclamped position.
Figure 11:
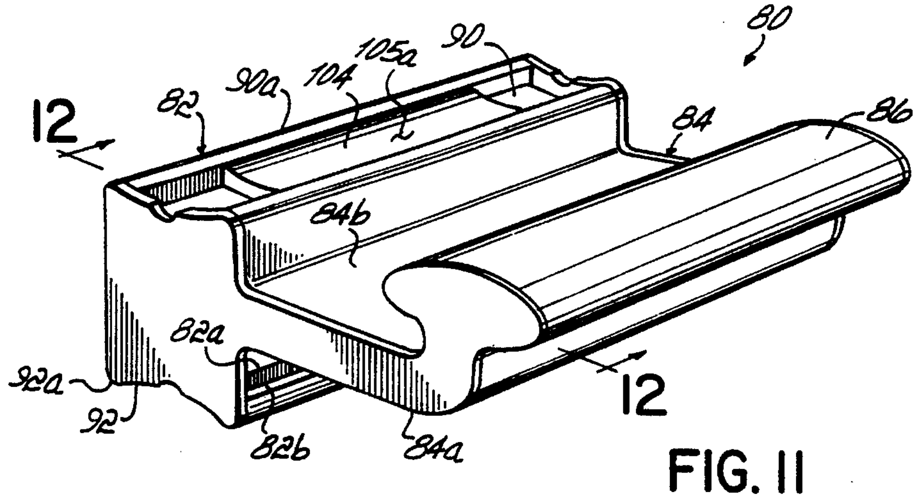
FIG. 11 is a perspective view of an alternative embodiment of the offset mount bracket.

Referring now to FIGS. 5, 6 and 7, the clamping leg 40 is the portion of the clamping member 32 that engages a side of the siderail 11. This clamping leg 40 forms one side of the channel 20 contained in the base 18 and has an inwardly curved engaging surface 41 that is adapted to partially envelop one lateral side of the siderail 11 when the clamping member 32 is in the unclamped position. On the opposing side of the channel 20 is a siderail engaging body 42 having an inwardly curved engaging surface 43 adapted to partially envelop the other lateral side of the siderail 11. This engaging body 42 runs along the full length of the channel 20 and is secured to the base internal vertical wall 39 that also runs along the entire length of the channel. The engaging body 42 may be constructed from any suitable material, but a material that aids in gripping the siderail 11 such as urethane is preferred. To affix the engaging body 42 to the internal vertical wall 39 any suitable means may be used including screws or an adhesive although adhesive is preferred for better contact and ease of manufacture.

The final edge of the channel 20 is formed by the aforementioned transversely extending portion 48 of the base 18. This transverse portion runs along the entire length of the base 18 and has a concave surface 49 adapted to engage the upper side of the siderail 11. Surfaces 41, 43 and 49 of clamping leg 40, engaging body 42 and portion 48, respectively, envelope the generally elliptically cross-sectioned siderail 11 of the sideguard 12.

When the thumb slide 22 is in the unclamped position, the channel 20 is of a sufficient size to permit the base 18 to be placed onto or removed from the siderail 11 of a hospital bed sideguard 12 (FIG. 5). However, when the thumb slide 22 is in the clamped position, the three channel sides and their respective surfaces 41, 43 and 49 substantially envelop the sideguard thus securely affixing the telephone assembly 14 thereto (FIG. 6).

In use, the telephone assembly is secured to the hospital bed sideguard 12 in the following manner. The thumb slide 22 is moved to the unclamped position which allows the clamping member 32 to return to its unclamped position thus expanding the channel 20 to its largest size. The base 18 is then placed upon the siderail 11 of hospital bed sideguard 12 and positioned so as to provide the patient with the greatest access. Once the base has been positioned, the user slides the thumb slide 22 to its clamped position, or as near to the clamped position as possible. The assembly 14 is then securely affixed to the sideguard 12. Friction between the mating surfaces of the thumb slide 22 and lower base half 18*b* and the thumb slide 22 and clamping member 32 retain the clamping mechanism 21 in the clamped position. To remove or reposition the assembly, the thumb slide 22 is simply returned to its unclamped position thus releasing the clamping member 32 from contact with siderail 11.

Figure 9:
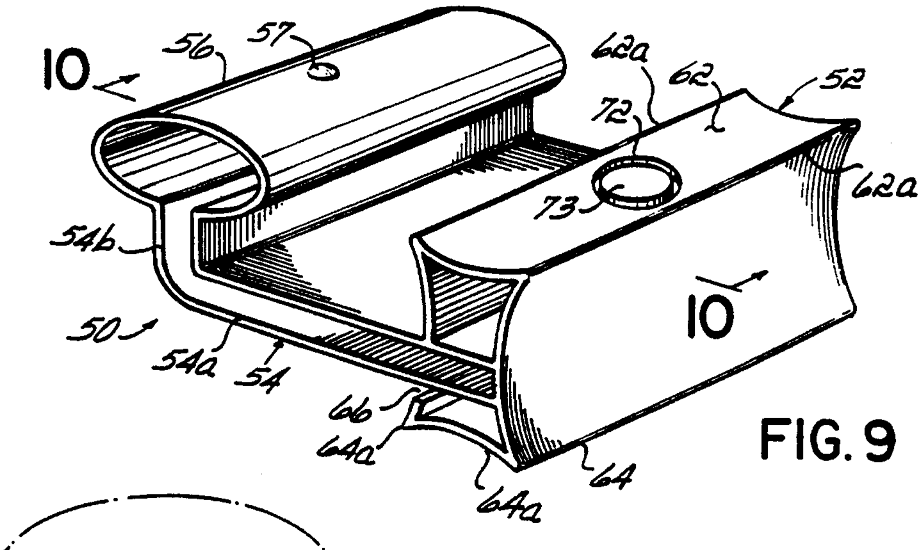
FIG. 9 is a perspective view of a first embodiment of the offset mount bracket.
Figure 10:
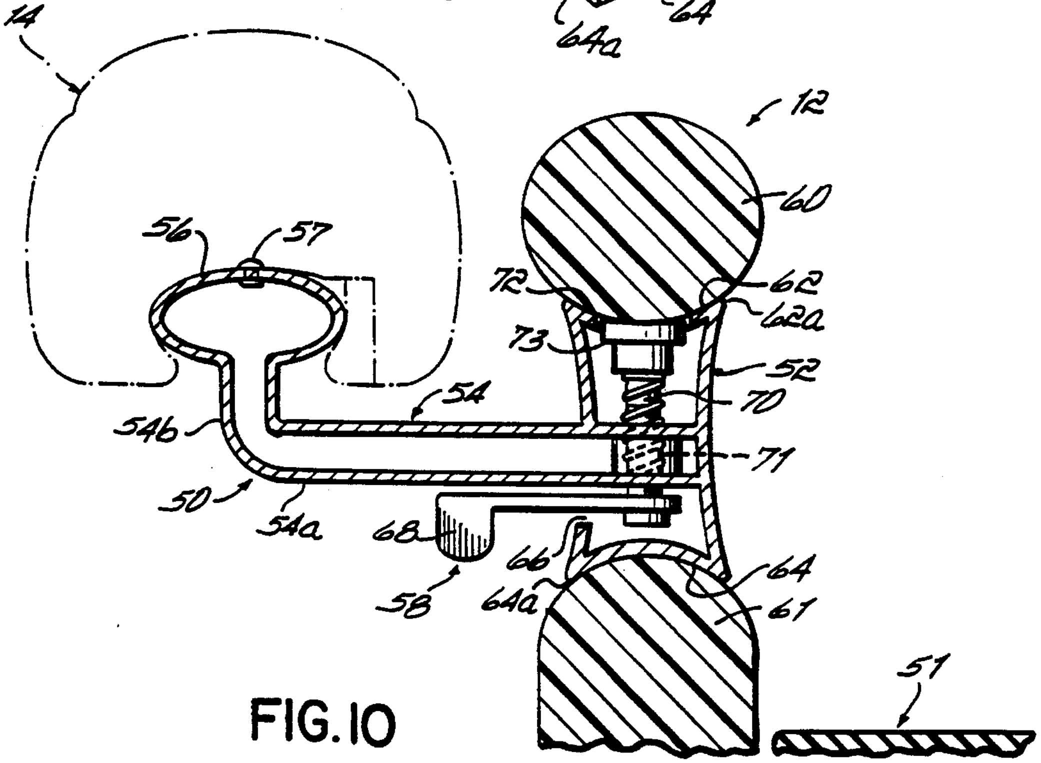
FIG. 10 is a sectional view taken on line 10—10 of FIG. 9 and further including a birthing bed sideguard to which the offset mount is attached.

Although the telephone assembly 14 described above is effective for standard hospital beds, a problem arises when it is used on a birthing bed whose sideguard 12 is vertically raised and lowered. On those beds, the mattress 51 (FIG. 10) is substantially adjacent to the sideguard 12. To permit a patient to enter or leave the bed, the sideguard 12 is vertically lowered. Because the assembly 14 overlaps siderail 11, the sideguard 12 could not be lowered with the telephone 14 in place; the telephone 14 would contact the mattress 51 and thus prevent further lowering of the sideguard 12. This would require removal and reattachment of the telephone assembly each time a patient would enter or leave the bed. To remedy this, an offset mount 50 is used as shown in FIGS. 9 and 10. With the offset mount 50, the telephone assembly 14 can be affixed to the sideguard of a birthing bed without interfering with the sideguard's operation. In one form, the offset mount 50 comprises a main body 52, an extender arm 54, a telephone assembly receptacle 56, and a locking assembly 58.

The main body 52 is adapted to fit between adjacent siderails 60 and 61 of sideguard 12. To establish a secure fit between the sideguard 12 and the main body 52, the top 62 and bottom 64 surfaces of the main body are concave in shape so as to substantially match the curvature of the lower and upper sides of the siderails 60, 61, respectively. The distance between adjacent rails 60 and 61 of a birthing bed sideguard varies along the length of the sideguard. The birthing bed sideguard for which the offset mount 50 is particularly designed is disclosed in copending application Ser. No. 07/627,964 filed Dec. 17, 1990 entitled Sideguard For A Birthing Bed which is assigned to the assignee of the present invention, and is hereby incorporated by reference herein in its entirety. The main body 52 is simply inserted between adjacent siderails 60, 61 at a point where the top-to-bottom distance between the upper edges 62*a*, 62*a* and lower edges 64*a*, 64*a* of the main body 52 is less than the distance between the siderails 60, 61. The main body 52 is then slid along the rails 60, 61 to the point where it snugly fits between the siderails 60, 61. The main body 52 is fabricated from a thin sheet of material with a gap 66 in one of the walls, and preferably is fabricated of extruded aluminum.

The offset arm 54 is attached to the main body 52 and extends laterally therefrom. The arm 54 can be solid or hollow, however, it is preferable to manufacture it from extruded aluminum due to the decreased weight and cost of manufacture. All that is required is that the wall thickness of the extrusion be sufficiently thick to provide the strength necessary to support the telephone assembly 14. The offset arm 54 is generally L-shaped with a relatively long foot 54*a* and a relatively short leg 54*b*.

Finally, at the upper end of leg 54*b* of the offset arm 54 is a telephone assembly receptacle 56. The receptacle extends vertically upward from the leg **54*b* of offset arm 54 and has a cross-section generally similar to that of a standard hospital bed siderail. This ensures that a secure fit is established between the telephone assembly 14 and the offset mount 50. Again, although the receptacle 56** can be hollow or solid, a hollow construction is preferred for ease of fabrication and low cost.

To aid in positioning the telephone assembly 14 onto the receptacle 56, an alignment button 57 is centrally located on the receptacle 56. A corresponding alignment depression 59 is located in the telephone base 14 (FIG. 7). Together, the alignment button 57 and depression 59 provide a positive indication that the telephone assembly 14 is centrally positioned on the receptacle 56.

To secure the offset mount 50 to the sideguard 12, a locking assembly 58 is actuated after the main body 52 is inserted between the adjacent siderails 60, 61. In one form, the locking assembly 58 comprises a locking lever 68 and a screw 70. The screw 70 extends through a matingly threaded hole 71 in the offset arm 54 and can engage the siderail 60 through an opening 72 in the upper surface 62 of main body 52. As the locking lever 68 is rotated in a first direction, the screw 70 is advanced upwardly and a plunger 73 on the upper end of the screw 70 engages the lower side of siderail 60 locking the offset mount thereto by forcing surface 64 downwardly against upper side of siderail 61. To remove the offset mount 50, the locking lever 68 is rotated in the opposite direction, thus retracting the screw 70 and disengaging the plunger 73 from the siderail 60.

The components of the offset mount 50 can be manufactured using any suitable material including aluminum or plastic. Although the offset mount, excluding the locking assembly 58, can be manufactured in separate components which are then joined by screws, glue, welding, or other suitable means, it is preferable to fabricate the offset mount as a single unitary structure. The most preferable method of producing the offset mount is by extrusion forming from plastic or aluminum. The locking assembly and its components are best formed by plastic injection molding.

The offset mount 50 is utilized in the following manner. The extender arm 54 and telephone receptacle 56 are inserted between adjacent siderails 60, 61 of the hospital bed sideguard 12 from the bed side. Before the locking assembly 58 is actuated, the offset mount 50 is moved along the siderails until the offset mount is snugly fitted between the siderails in the desired location. The locking lever 68 is then rotated, securely affixing the mount to the siderails. At this point, the telephone assembly 14 may be secured atop the telephone receptacle 56 using the procedure previously described. To remove the offset mount 50 from the siderails 60, 61, the telephone assembly 14 is first removed following the previously described procedure. Next, the locking lever 68 is rotated in the opposite direction. Then the main body 52 is released from between the siderails. Finally, the offset mount 50 is removed through the bed side of the siderails.

A preferred embodiment of the offset mount 80, which also solves the problem of affixing the telephone 14 to the sideguard 12 without interfering with the sideguard's operation, is shown in FIGS. 11–14. As with the first embodiment, the offset mount 80 comprises a main body 82, an extender arm 84, a telephone assembly receptacle 86, and a locking assembly 88.

The main body 82 is adapted to fit between adjacent siderails 60 and 61 of sideguard 12 and the top-to-bottom distance between the upper edges **90*a*, 90*a* and lower edges 92*a*, 92*a* of the main body 82 is no greater than the distance between adjacent rails 60 and 61. To establish a secure fit between the sideguard 12 and the main body 82, the bottom surface 92 of the main body is concave in shape so as to substantially match the curvature of the upper side of siderail 61. Similarly, the clamping pad 104, which is part of a locking assembly 88, is concave in shape so the clamping pad upper surface 105*a* substantially matches the curvature of the lower side of siderail 60**.

The offset arm 84 is attached to the main body 82 and extends laterally therefrom. The arm 84 can be solid or hollow, however, it is preferable to manufacture it from extruded aluminum due to the decreased weight and cost of manufacture. All that is required is that the wall thickness of the extrusion be sufficiently thick to provide the strength necessary to support the telephone assembly 14. The offset arm 84 is generally L-shaped with a relatively long lower side **84*a* and a relatively short upper side 84*b***.

Finally, at the outer end of offset arm 84 is a telephone assembly receptacle 86. The receptacle extends vertically upward from the lower and upper sides **84*a* and 84*b* of offset arm 84 and has a cross-section generally similar to that of a standard hospital bed siderail. This ensures that a secure fit is established between the telephone assembly 14 and the offset mount 80. Again, although the receptacle 86** can be hollow or solid, a hollow construction is preferred for ease of fabrication and low cost.

Figure 12:
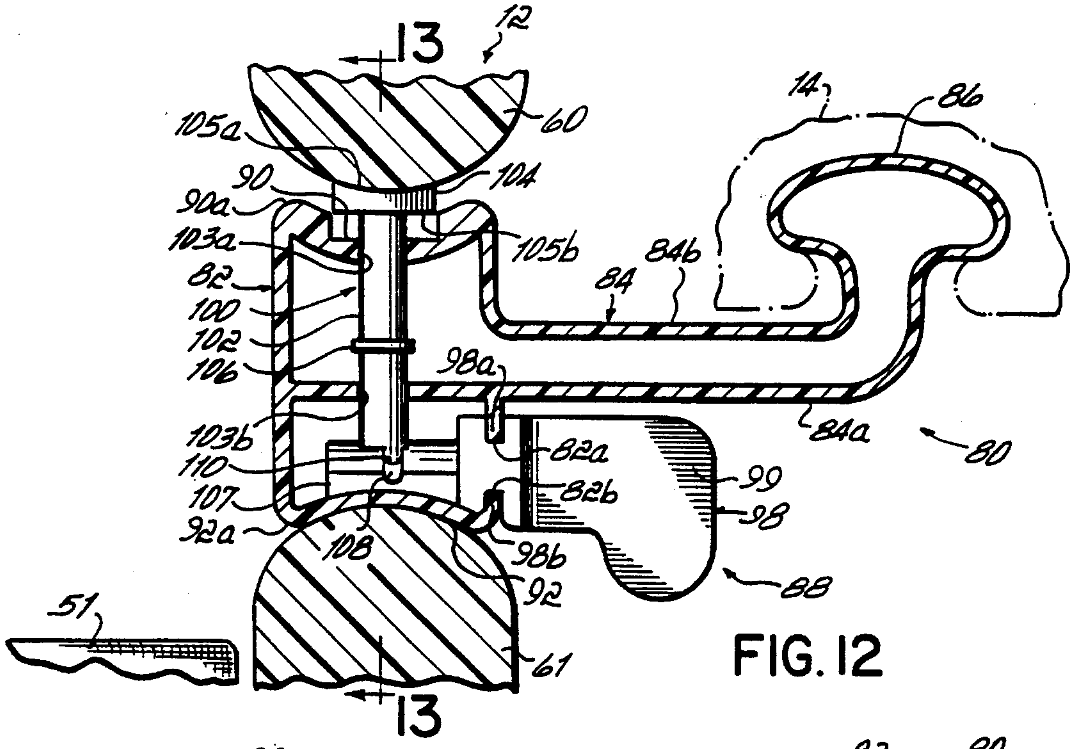
FIG. 12 is a sectional view taken on line 12—12 of FIG. 11 with the clamping mechanism in the clamped position and further including a birthing bed sideguard to which the offset mount is attached.
Figure 13:
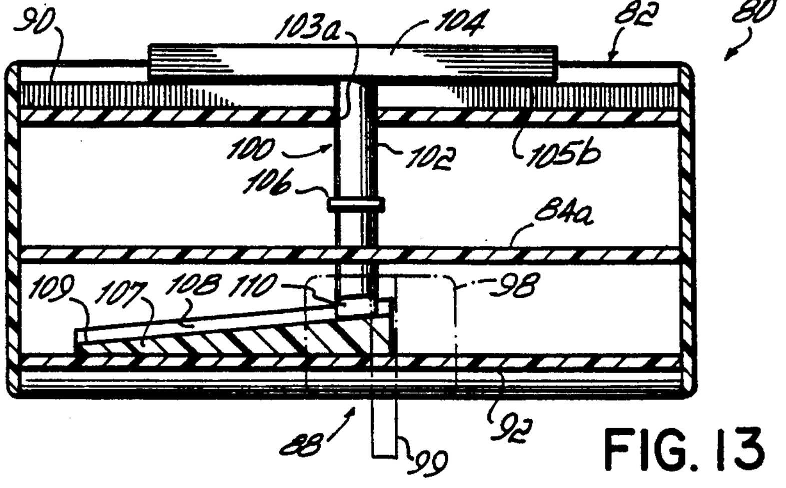
FIG. 13 is a sectional view taken on line 13—13 of FIG. 12.
Figure 14:
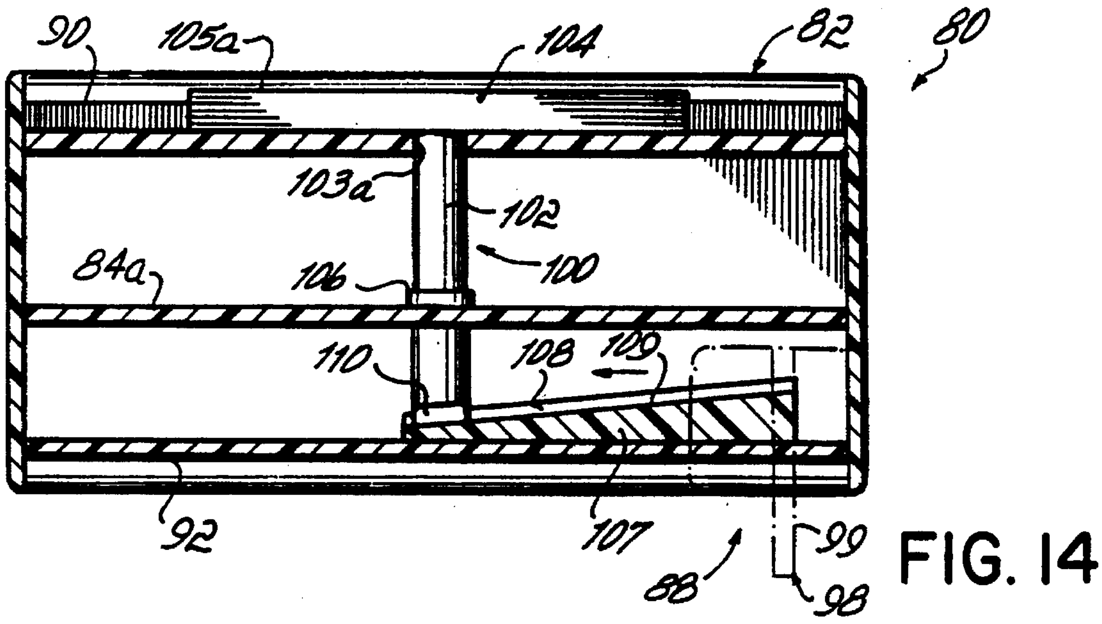
FIG. 14 is a view similar to FIG. 13, except with the clamping mechanism in the unclamped position.

To secure the offset mount 80 to the sideguard 12, a locking assembly 88 is actuated after the main body 82 is inserted between adjacent siderails 60, 61 (FIGS. 12–14).

The locking assembly 88 comprises a slide 98 and a clamping member 100. The slide 98 is horizontally slidably retained in the main body 82 so that the slide can be moved in a direction parallel to the longitudinal dimension of the main body. The slide 98 has longitudinal notches **98*a* and 98*b* which ride along upper 82*a* and lower 82*b* sections of the main body 82. Slide 98 has a thumb tab 99 for ease of movement of the slide as by a thumb or fingers. A clamping member 100 is vertically slidably retained in the offset mount 80. This clamping member 100 is comprised of a shaft 102 and a clamping pad 104. The shaft 102, which can have any suitable cross section (though circular is preferred) passes through mating holes 103*a* and 103*b* in the main body upper edge 90 and offset arm lower side 84*a* respectively. Thus the shaft 102 can slidably move in a vertical direction. To prevent the clamping member 100 from falling out of the main body 82, a collar 106 is located on the shaft 102. A rib 110 is located on the bottom of the shaft 102. This rib 110 mates with a groove 108 that runs the length of a wedge 107 protruding from the back of the slide 98. When the slide 98 is in the unclamped position, the clamping pad lower surface 105*b* rests on the main body upper surface 90 and the rib 110 is not contacting the groove valley 109. As the slide 98 is moved from the position of FIG. 14 to the position of FIG. 13, the groove valley 109 engages the rib 110 and the clamping member 100 is urged vertically away from the wedge 107. As the clamping member 100 is urged vertically upward, the clamping pad upper surface 105*a* engages the lower side of siderail 60 locking the offset mount 80 to the sideguard 12 by forcing the main body lower surface 92 downwardly against the upper side of siderail 61. The resulting configuration of the locking assembly 88 in the clamped position is shown in FIGS. 12 and 13**.

To restore the locking assembly 88 to the unclamped configuration (FIGS. 11 and 14) the slide 98 is returned to the unclamped position. As the slide 98, wedge 107 and groove 108 move, the clamping member 100 moves vertically downward due to gravity.

Although any device that could serve to move the clamping member 100 into and out of a clamped position may be used (such as a lever or screws), the slide 98 has several advantages. First, there are a minimum of moving parts thus reducing the likelihood that the clamping mechanism will fail. Second, a minimum of space is used. Finally, this method is inexpensive and is easy to manufacture and maintain.

The components of the offset mount 80 can be manufactured using any suitable material including aluminum or plastic. Although the offset mount, excluding the locking assembly 88, can be manufactured in separate components which are then joined by screws, glue, welding, or other suitable means, it is preferable to fabricate the offset mount as a single unitary structure. The most preferable method of producing the offset mount is by extrusion forming from plastic or aluminum. The locking assembly and its components are best formed by plastic injection molding.

The offset mount 80 is utilized in the following manner. The main body 82 is inserted between adjacent siderails 60, 61 of the hospital bed sideguard 12. Before the locking assembly 88 is actuated, the offset mount 80 is moved along the siderails until the offset mount is snugly fitted in the desired location. The slide 98 is then translated, securely affixing the mount to the siderails. At this point, the telephone assembly 14 may be secured atop the telephone receptacle 86 using the procedure previously described. To remove the offset mount 80 from the siderails 60, 61, the telephone assembly 14 is first removed following the previously described procedure. Next, the slide 98 is translated in the opposite direction. Finally, the offset mount 80 is removed from between the siderails.

Those skilled in the art will readily recognize numerous adaptions and modifications which can be made to the present invention and which will result in an improved hospital bed sideguard mountable telephone, yet all of which will come within the spirit and scope of the present invention as defined by the following claims. Accordingly, the invention is to be limited only by the following claims and their equivalents.

Having described the invention, what is claimed is:

1. A hospital bed sideguard mounted telephone assembly comprising:

a handset;

a base for receiving said handset and for attachment to a hospital bed siderail, said base having a longitudinal axis;

a clamp slideably mounted in said base for sliding movement generally perpendicular said base longitudinal axis;

a thumb slide slideably mounted on said base for sliding movement generally parallel said base longitudinal axis; and means for transferring sliding motion of said thumb slide into sliding motion of said clamp to removably secure the siderail between said clamp and a portion of said base.

2. The hospital bed sideguard mounted telephone of claim 1 wherein said means for transferring sliding motion of said thumb slide into sliding motion of said clamp comprises a pair of mating wedges, one wedge of said pair of mating wedges being mounted to said clamp and the other wedge of said pair of mating wedges being mounted to said thumb slide.

3. The hospital bed sideguard mounted telephone of claim 1 wherein said clamp is resiliently biased to a normally unclamped position by a resilient member.

4. The hospital bed sideguard mounted telephone of claim 1 wherein said base includes a channel therein along said base longitudinal axis, said channel including a sidewall, and wherein the siderail is clamped between the channel sidewall and the clamp.

* * * * *